US012707038B2

(12) United States Patent
Hong et al.

(10) Patent No.: US 12,707,038 B2
(45) Date of Patent: Aug. 11, 2026

(54) METHOD AND APPARATUS FOR VIDEO CODING USING SECONDARY MOST PROBABLE MODE LIST BASED ON TEMPLATE MATCHING

(71) Applicants: Hyundai Motor Company, Seoul (KR); Kia Corporation, Seoul (KR); Kwangwoon University Industry-Academic Collaboration Foundation, Seoul (KR)

(72) Inventors: Myung Oh Hong, Gwangmyeong (KR); Min Hun Lee, Uijeongbu (KR); Dong Gyu Sim, Seoul (KR); Jin Heo, Yongin (KR); Seung Wook Park, Yongin (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

(21) Appl. No.: 18/736,338

(22) Filed: Jun. 6, 2024

(65) Prior Publication Data

US 2024/0323358 A1 Sep. 26, 2024

Related U.S. Application Data

(63) Continuation of application No. PCT/KR2022/015493, filed on Oct. 13, 2022.

(30) Foreign Application Priority Data

Dec. 10, 2021 (KR) ........................ 10-2021-0176722
Oct. 12, 2022 (KR) ........................ 10-2022-0130305

(51) Int. Cl.
*H04N 19/105* (2014.01)
*H04N 19/176* (2014.01)
*H04N 19/46* (2014.01)

(52) U.S. Cl.
CPC ......... *H04N 19/105* (2014.11); *H04N 19/176* (2014.11); *H04N 19/46* (2014.11)

(58) Field of Classification Search
CPC ..... H04N 19/105; H04N 19/176; H04N 19/46
USPC ....................................................... 375/240.2
See application file for complete search history.

(56) References Cited

U.S. PATENT DOCUMENTS

2018/0316929 A1 11/2018 Li et al.
2020/0404261 A1 12/2020 Zhao et al.
2021/0266525 A1 8/2021 Tsukuba
2021/0360234 A1 11/2021 Wang et al.
(Continued)

FOREIGN PATENT DOCUMENTS

KR 10-2019-0056332 A 5/2019
KR 10-2021-0021971 A 3/2021
(Continued)

*Primary Examiner* — Albert Kir
(74) *Attorney, Agent, or Firm* — Fox Rothschild LLP

(57) ABSTRACT

A method and apparatus for video coding utilize a template matching-based secondary MPM list. The video coding method and the apparatus generate a secondary most probable mode (MPM) list according to a gradient-based template matching result and utilize the secondary MPM list for intra prediction of the current block for improving video coding efficiency and enhancing video quality.

10 Claims, 20 Drawing Sheets

(56) References Cited

U.S. PATENT DOCUMENTS

2022/0272357 A1 8/2022 Jun et al.
2023/0112074 A1* 4/2023 Li .......................... H04N 19/11
375/240.13
2023/0113104 A1* 4/2023 Li ........................ H04N 19/196
375/240.12
2023/0179784 A1* 6/2023 Li ........................ H04N 19/105
2024/0305824 A1* 9/2024 Deng ..................... H04N 19/52
2024/0323353 A1* 9/2024 Zhang .................... H04N 19/52
2025/0267257 A1* 8/2025 Lin ........................ H04N 19/11

FOREIGN PATENT DOCUMENTS

KR 10-2021-0134402 A 11/2021
WO WO-2023075450 A1 * 5/2023 ........... H04N 19/176

* cited by examiner

Corresponding Block

Corresponding Block Including Similar Template

METHOD AND APPARATUS FOR VIDEO CODING USING SECONDARY MOST PROBABLE MODE LIST BASED ON TEMPLATE MATCHING

CROSS-REFERENCE TO RELATED APPLICATIONS

This application is a continuation of International Application No. PCT/KR2022/015493 filed on Oct. 13, 2022, which claims under 35 U.S.C. § 119(a) the benefit of Korean Patent Application No. 10-2021-0176722, filed on Dec. 10, 2021, and Korean Patent Application No. 10-2022-0130305, filed on Oct. 12, 2022, the entire disclosures of each of which are incorporated herein by reference.

BACKGROUND

(a) Technical Field

The present disclosure relates to a video coding method and an apparatus using a secondary most probable mode (MPM) list based on template matching.

(b) Description of the Related Art

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

The template matching-based intra-prediction technique utilizes a template composed of the reconstructed samples adjacent to the current block to search for the most similar template in the reconstruction region and then generate a corresponding block to a similar template as a prediction block of the current block. For example, the encoder and decoder may generate a prediction block by using a template adjacent to the current block. This operation involves no transmission of motion vector information corresponding to the displacement between the template and the similar template. As the amount of data increases, the template matching-based intra-prediction technique needs to be further advanced to improve video coding efficiency and enhance video quality.

SUMMARY

The present disclosure provides a video coding method and an apparatus for generating a secondary most probable mode (MPM) list according to a gradient-based template matching result to improve video coding efficiency and enhance video quality. The video coding method and the apparatus utilize the secondary MPM list for intra prediction of the current block.

At least one aspect of the present disclosure provides a method of decoding a current block, performed by a video decoding device. The method includes decoding from a bitstream a residual block of the current block, and a secondary most probable mode (MPM) flag that indicates whether a secondary MPM list is to be used. The method also includes checking the secondary MPM flag. When the secondary MPM flag is true, the method further includes searching for a similar template by performing gradient-based template matching in a predefined search region of the current block, deriving and ordering intra-prediction modes by using a corresponding block for the similar template, composing the secondary MPM list for the current block by using ordered intra-prediction modes, and decoding a secondary MPM index from the bitstream.

Another aspect of the present disclosure provides a method of encoding a current block, performed by a video encoding device. The method includes generating a template of the current block and calculating a gradient magnitude of the template. The method also includes comparing the gradient magnitude to a preset threshold. When the gradient magnitude is greater than the preset threshold, the method further includes searching for a similar template that is similar to the template by performing gradient-based template matching in a predefined search region of the current block, deriving and ordering intra-prediction modes by using a corresponding block for the similar template, composing a secondary most probable mode (MPM) list for the current block by using ordered intra-prediction modes, setting a secondary MPM flag that indicates whether the secondary MPM list is to be used, and determining a secondary MPM index.

Yet another aspect of the present disclosure provides a computer-readable recording medium storing a bitstream generated by a video encoding method. The video encoding method includes generating a template of a current block and calculating a gradient magnitude of the template. The video encoding method also includes comparing the gradient magnitude to a preset threshold. When the gradient magnitude is greater than the preset threshold, the video encoding method further includes searching for a similar template that is similar to the template by performing gradient-based template matching in a predefined search region of the current block, deriving and ordering intra-prediction modes by using a corresponding block for the similar template, composing a secondary most probable mode (MPM) list for the current block by using ordered intra-prediction modes, setting a secondary MPM flag that indicates whether the secondary MPM list is to be used, and determining a secondary MPM index.

As described above, the present disclosure provides a video coding method and an apparatus that generate a secondary MPM list according to a gradient-based template matching result. The video coding method and the apparatus utilize the secondary MPM list for intra prediction of the current block. Thus, the video coding method and the apparatus can improve video coding efficiency and enhance video quality.

DETAILED DESCRIPTION

Figure 1:
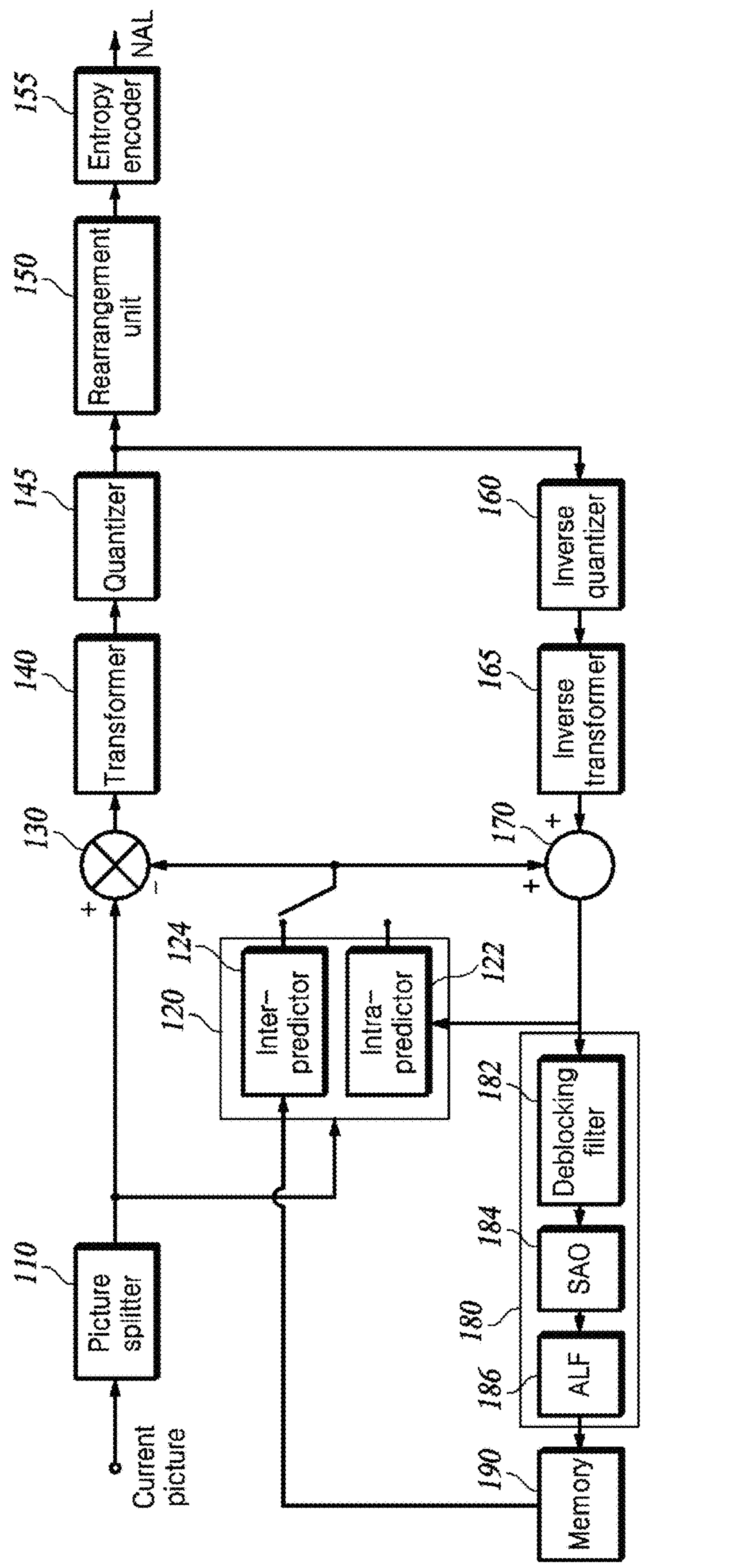
FIG. 1 is a block diagram of a video encoding apparatus that may implement the techniques of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a binary tree ternary tree (BTTT) is added to the tree structures to be referred to as a multiple-type tree (MTT).

Figure 2:
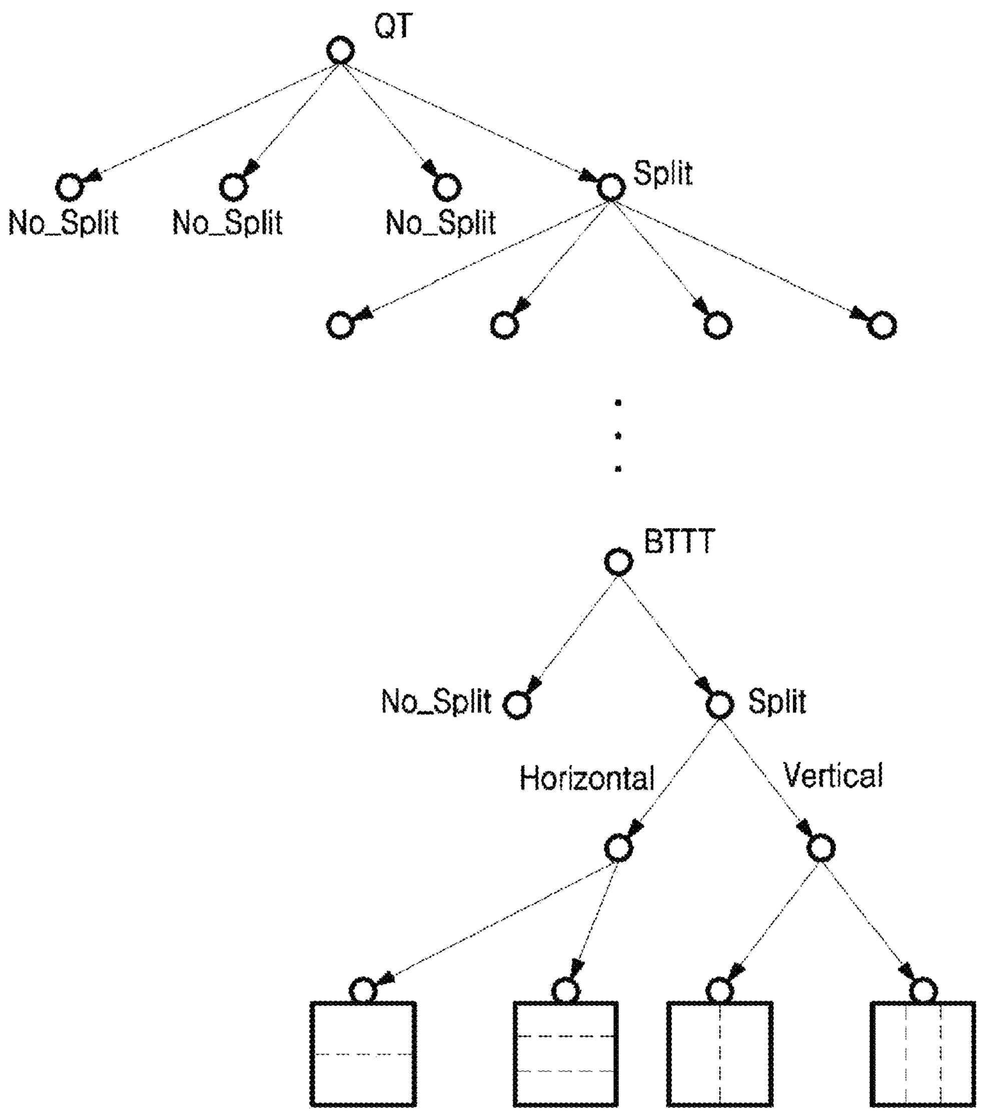
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
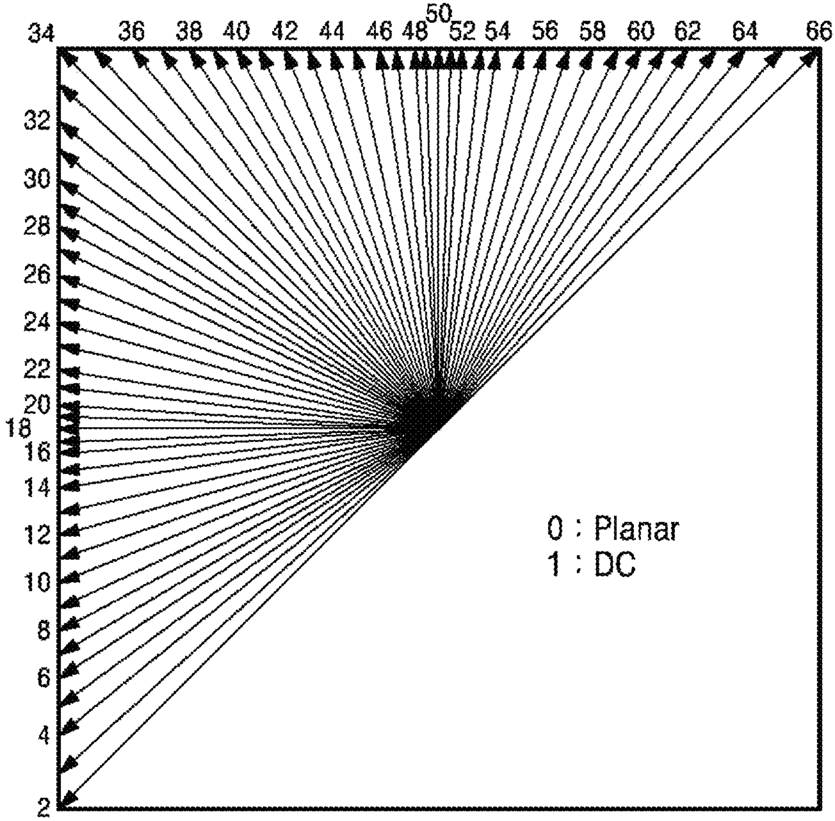
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
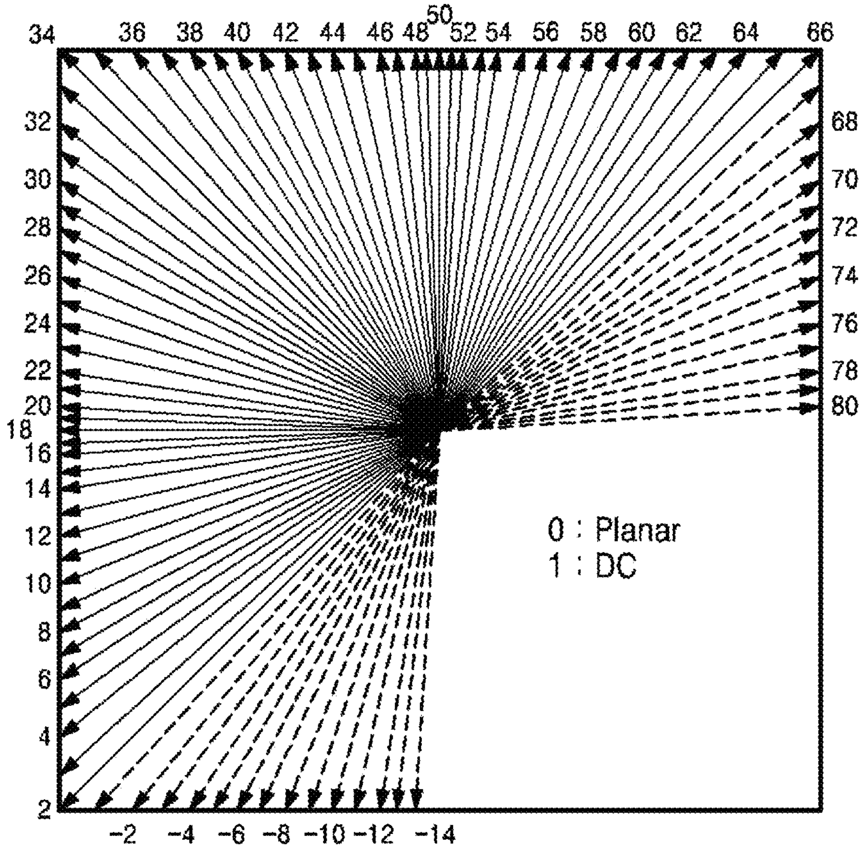

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
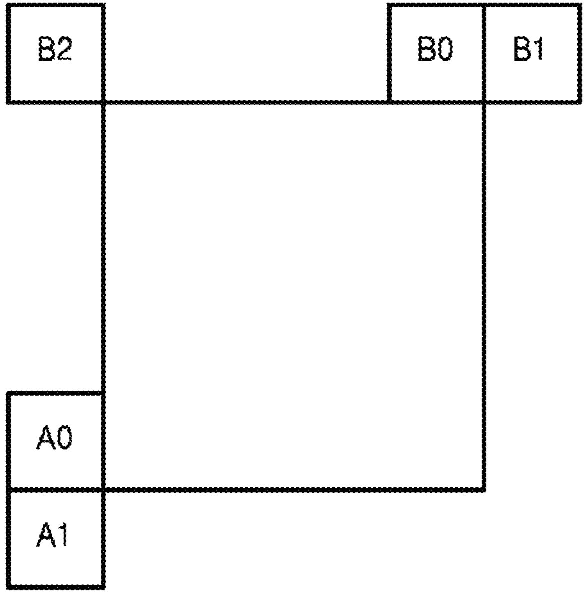
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
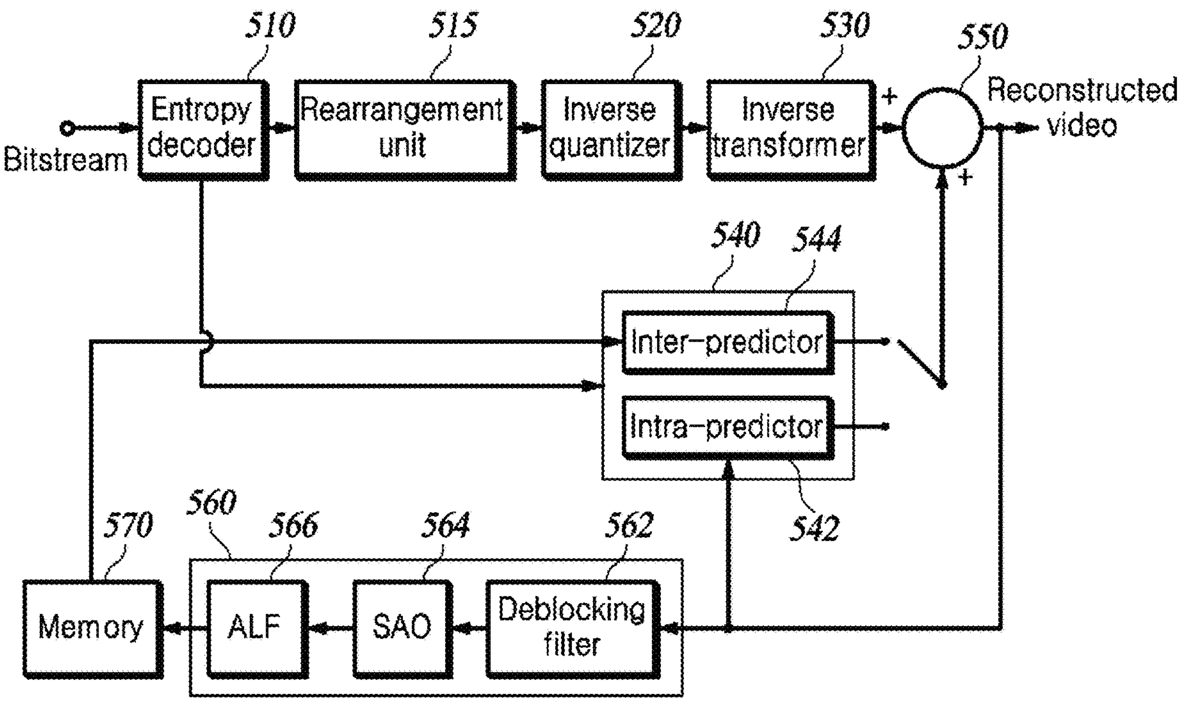
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a secondary Most Probable Mode (MPM) list based on a gradient-based template matching result. The video coding method and the apparatus utilize the secondary MPM list for intra prediction of the current block.

The following embodiments may be performed by the intra predictor 122 in the video encoding device. They may also be performed by the intra predictor 542 in the video decoding device.

The video encoding device, in intra-predicting the current block, may generate signaling information associated with the present embodiments in terms of optimizing bit rate distortion. The video encoding device may use the entropy encoder 155 to encode the signaling information and transmit it to the video decoding device. The video decoding device may use the entropy decoder 510 to decode, from the bitstream, the signaling information associated with the intra-prediction of the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Intra-Prediction Techniques

Intra prediction, as described above, is a method of predicting the current block by referring to samples that exist in the neighborhood of the current block to be encoded. In the Versatile Video Coding (VVC) technique, the intra-prediction mode has subdivided directional modes (i.e., 2 to 66) in addition to non-directional modes (i.e., planar and DC), as illustrated in FIG. 3A. In addition, as further illustrated in FIG. 3B, the intra-prediction mode of the luma block has directional modes (−14 to −1 and 67 to 80) based on wide-angle intra prediction (WAIP).

Further, the intra prediction may utilize prediction techniques such as Multiple Reference Line intra Prediction (MRLP), Intra Sub-Partitions (ISP), Most Probable Mode (MPM), and the like.

In Multiple Reference Line intra Prediction (MRLP) for intra prediction, the video encoding/decoding devices may utilize more reference lines by utilizing Multiple Reference Line (MRL). When MRL is applied, the video encoding/decoding devices may use the original reference line plus two additional lines at the top and left sides of the current block. For selection of the reference line when MRL is applied, an index of (mrl_idx) indicating the reference line may be signaled to the video decoding device.

The Most Probable Mode (MPM) technique for intra prediction of the current block utilizes the intra-prediction mode of the neighboring block. The video encoding device generates an MPM list to include intra-prediction modes derived from predefined locations that are spatially adjacent to the current block. When applying the MPM mode, the video encoding device may send the video decoding device a flag of MPM_flag, indicating whether the MPM list is to be used. Further, the video encoding device may transmit an MPM index of mpm_idx, in place of the index of the prediction mode, to improve the coding efficiency of the intra-prediction mode.

The ISP technique may subdivide the current block into smaller blocks of equal size, and then share the intra-prediction mode across the subblocks, but apply the transform to each of the subblocks. The block subdivision may be performed in a horizontal or vertical direction.

In the following description, the large block before being subdivided is referred to as the current block, and the subdivided smaller blocks are each referred to as a subblock.

When subdividing the current block in the horizontal or vertical direction, if the size of the current block is too small, the coding efficiency of the subdivided subblocks may be rather reduced, or the size of the subblocks may be smaller than the minimum unit for transform, which may disqualify the subblocks for the transform. To prevent this from happening, the application of Intra Sub-Partitions (ISP) may be limited by reference to the size of the subblock obtained after the partition. For example, if the number of pixels in the subdivided subblock is 16 or more, subdivision may be applied. For example, if the current block is 4×4 in size, ISP is not applied. A block with a size of 4×8 or 8×4 may be split into two subblocks with the same shape and size, which is called a Half_Split. Blocks of other sizes may be split into four subblocks of the same shape and size, which is called Quarter_Split.

II. Secondary MPM List Based on Template Matching

The following embodiments may be performed in the video encoding device by the intra prediction unit 122 and the entropy encoder 155. Further, the following embodiments may be performed in the video decoding device by the entropy decoder 510 and the intra prediction unit 542.

Hereinafter, the MPM list described above is used interchangeably with the primary MPM list. Additionally, in the following description, the MPM list generated based on template matching is referred to as the secondary MPM list.

Figure 7:
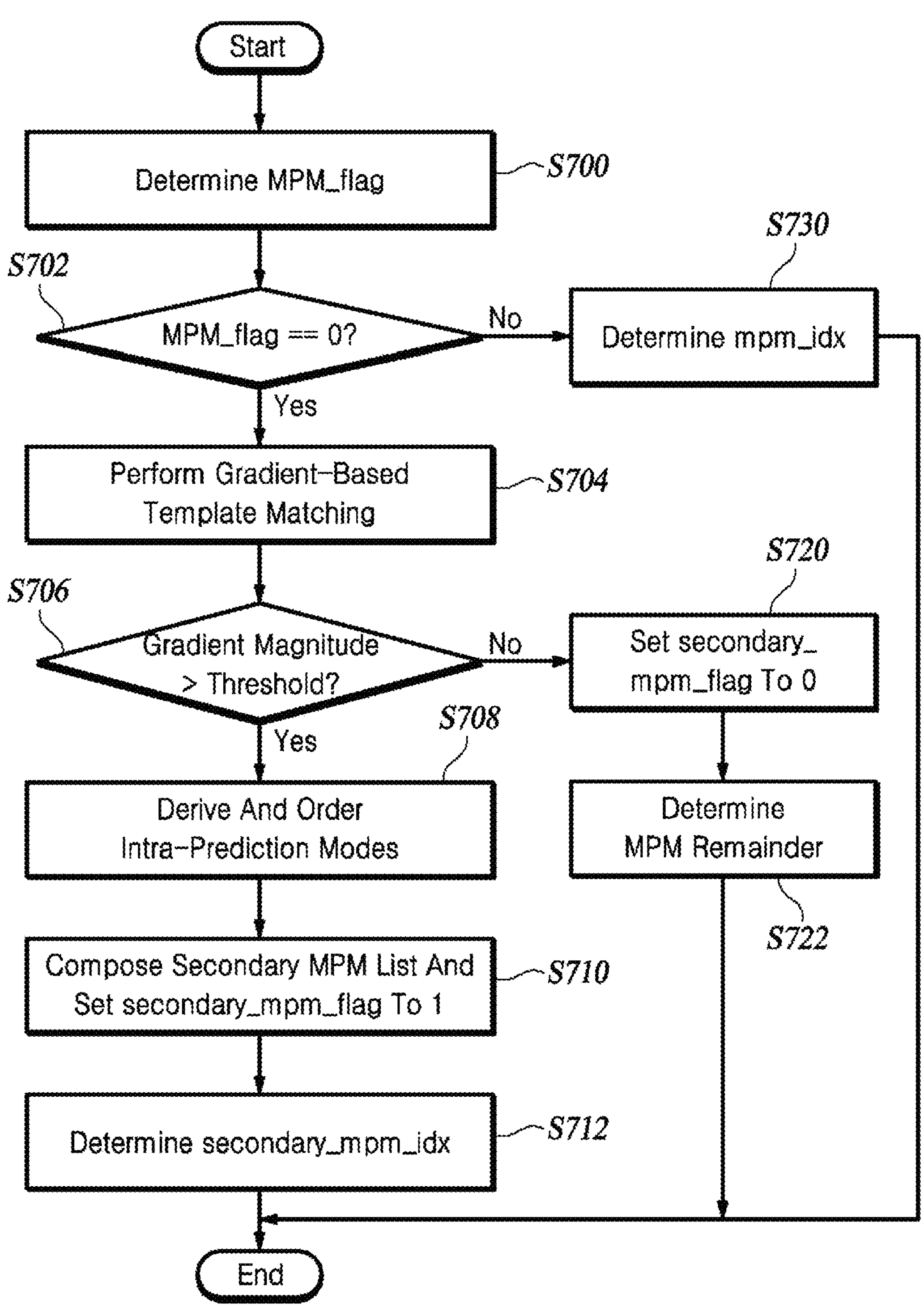
FIG. 7 is a flowchart of a method for a video encoding device to generate a secondary most probable mode (MPM) list, according to at least one embodiment of the present disclosure.

FIG. 7 is a flowchart of a method for the video encoding device to generate a secondary MPM list, according to at least one embodiment of the present disclosure.

The video encoding device determines an MPM_flag (S700). Here, the MPM_flag indicates whether the primary MPM list is to be used.

The video encoding device checks the MPM_flag (S702).

If MPM_flag is false, the video encoding device takes the following steps.

The video encoding device performs gradient-based template matching in a predefined search region of the current block (S704).

The step of performing template matching according to the present embodiment may include sub-steps of setting a template of the current block, calculating a gradient magnitude of the template by applying a differential filter to the template, calculating a gradient magnitude of the predefined search region of the current block, and searching for a similar template by performing gradient-based template matching by using the gradient magnitude of the template and the gradient magnitude of the search region.

The video encoding device compares the gradient magnitude of the template to a threshold (S706).

If the gradient magnitude of the template is greater than the threshold, the video encoding device performs the following steps (S708 to S712).

In terms of reducing computational complexity, among the sub-steps of performing template matching in Step S704, the method may perform just setting the template of the current block and calculating the gradient magnitude of the template by applying a differential filter to the template. Therefore, upon checking whether, and determining that, the gradient magnitude is larger than the threshold, the method may perform, before Step S708, calculating the gradient magnitude of the predefined search region, and the searching for a similar template by performing gradient-based template matching by using the gradient magnitude of the template and the gradient magnitude of the search region.

The video encoding device uses a corresponding block that corresponds to a similar template for deriving and ordering intra-prediction modes (S708).

The video encoding device composes a secondary MPM list by using the ordered intra-prediction modes and sets a secondary_mpm_flag to 1 (S710). Here, the secondary MPM flag of secondary_mpm_flag indicates whether the secondary MPM list is to be used.

The video encoding device determines a secondary_mpm_idx (S712). Here, the secondary MPM index of secondary_mpm_idx indicates one of the intra-prediction modes stored in the secondary MPM list. The video encoding device may determine the secondary_mpm_idx in terms of optimizing encoding efficiency.

The video encoding device may then use the secondary_mpm_idx to derive an intra-prediction mode of the current block from the secondary MPM list. After generating a prediction block by using the intra-prediction mode, the video encoding device may subtract the prediction block from the current block to generate a residual block. The video encoding device may encode the MPM_flag, the secondary_mpm_flag, the secondary_mpm_idx, and the residual block.

If the gradient magnitude of the template is equal to or smaller than the threshold, the video encoding device sets the secondary_mpm_flag to zero (S720) and determines an MPM remainder (S722). The MPM remainder is an intra-prediction mode that is not included in the secondary MPM list or primary MPM list.

The video encoding device may then derive the intra-prediction mode of the current block according to the MPM remainder. After generating a prediction block by using the intra-prediction mode, the video encoding device may subtract the prediction block from the current block to generate a residual block. The video encoding device may encode the MPM_flag, the secondary_mpm_flag, the MPM remainder, and the residual block.

On the other hand, if MPM_flag is true, the video encoding device may perform the following steps.

The video encoding device determines mpm_idx (S730).

The video encoding device may then use the mpm_idx to derive the intra-prediction mode of the current block from the primary MPM list. After generating a prediction block by using the intra-prediction mode, the video encoding device may subtract the prediction block from the current block to generate a residual block. The video encoding device may encode the MPM_flag, mpm_idx, and the residual block.

Figure 8:
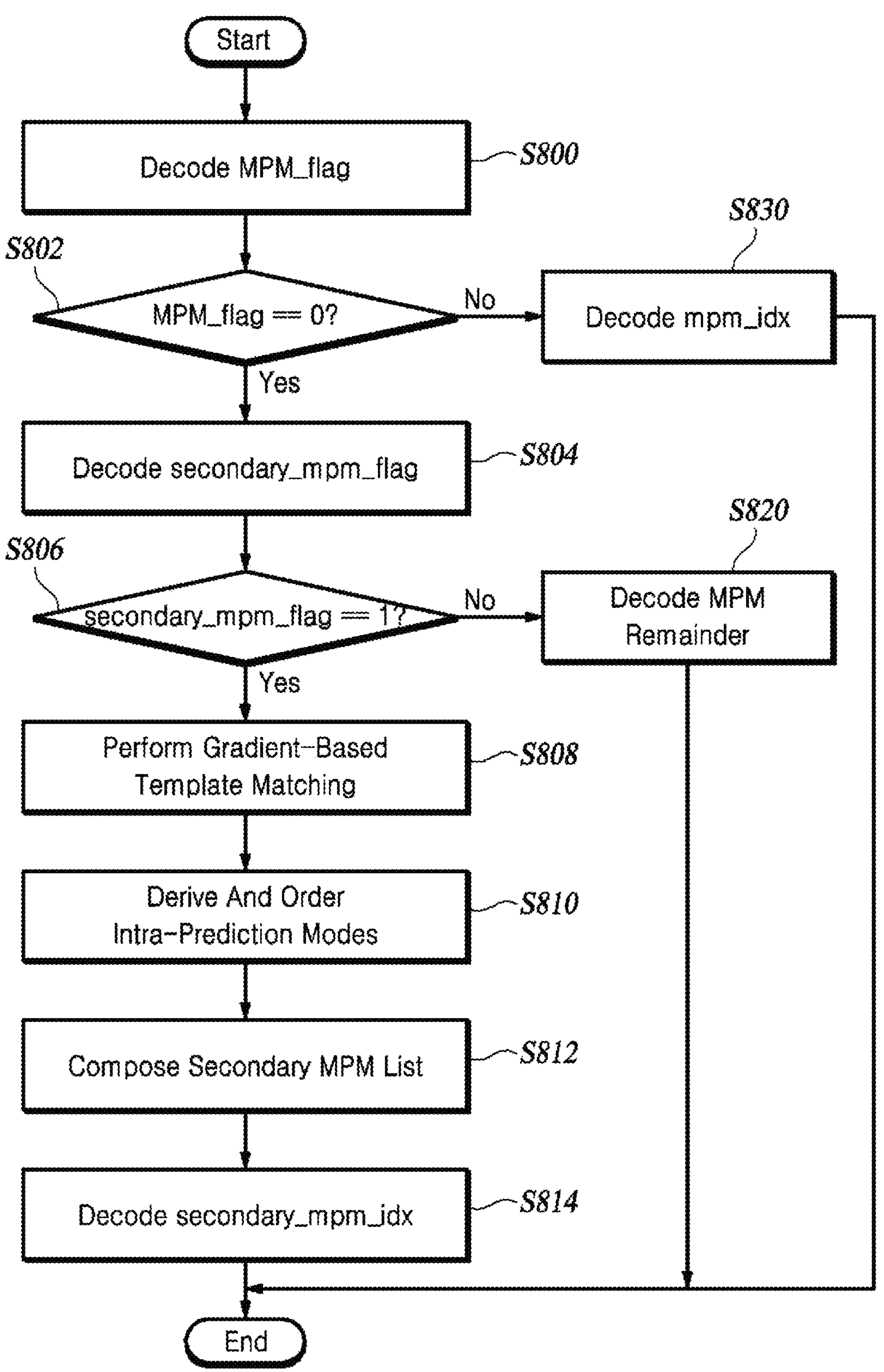
FIG. 8 is a flowchart of a method for a video decoding device to generate a secondary MPM list, according to at least one embodiment of the present disclosure.

FIG. 8 is a flowchart of a method for the video decoding device to generate a secondary MPM list, according to at least one embodiment of the present disclosure.

The video decoding device decodes the residual block and MPM_flag from the bitstream (S800).

The video decoding device checks the MPM_flag (S802).

If MPM_flag is false, the video decoding device performs the following steps.

The video decoding device decodes the secondary_mpm_flag from the bitstream (S804). Here, the secondary_mpm_flag indicates whether the secondary MPM list is enabled or disabled.

The video decoding device checks the secondary_mpm_flag (S806).

If secondary_mpm_flag is true, the video decoding device takes the following steps.

The video decoding device performs gradient-based template matching in a predefined search region of the current block to search for the similar template (S808).

The step of performing template matching according to the present embodiment may include setting a template of the current block, calculating a gradient magnitude of the template by applying a differential filter to the template, calculating a gradient magnitude of the predefined search region of the current block, and searching for the similar template by performing gradient-based template matching by using the gradient magnitude of the template and the gradient magnitude of the search region.

The video decoding device derives and orders the intra-prediction modes by using a corresponding block to the similar template (S810).

The video decoding device composes a secondary MPM list by using the ordered intra-prediction modes (S812).

The video decoding device decodes the secondary_mpm_idx from the bitstream (S814). Here, the secondary MPM index of secondary_mpm_idx indicates one of the intra-prediction modes stored in the secondary MPM list.

The video decoding device may then use the secondary_mpm_idx to derive the intra-prediction mode of the current block from the secondary MPM list. The video decoding device may generate a prediction block by using the intra-prediction mode, and then add the prediction block and the residual block to reconstruct the current block.

If the secondary_mpm_flag is false, the video decoding device decodes the MPM remainder from the bitstream (S820).

The video decoding device may then derive the intra-prediction mode of the current block based on the MPM remainder. The video decoding device may generate a prediction block by using the intra-prediction mode, and then add the prediction block and the residual block to reconstruct the current block.

On the other hand, if MPM_flag is true, the video decoding device may perform the following steps.

The video decoding device decodes mpm_idx from the bitstream (S830).

The video decoding device may then utilize the mpm_idx to derive the intra-prediction mode of the current block from the primary MPM list. The video decoding device may generate a prediction block by using the intra-prediction mode, and then sum the prediction block and the residual block to reconstruct the current block.

Figure 6:
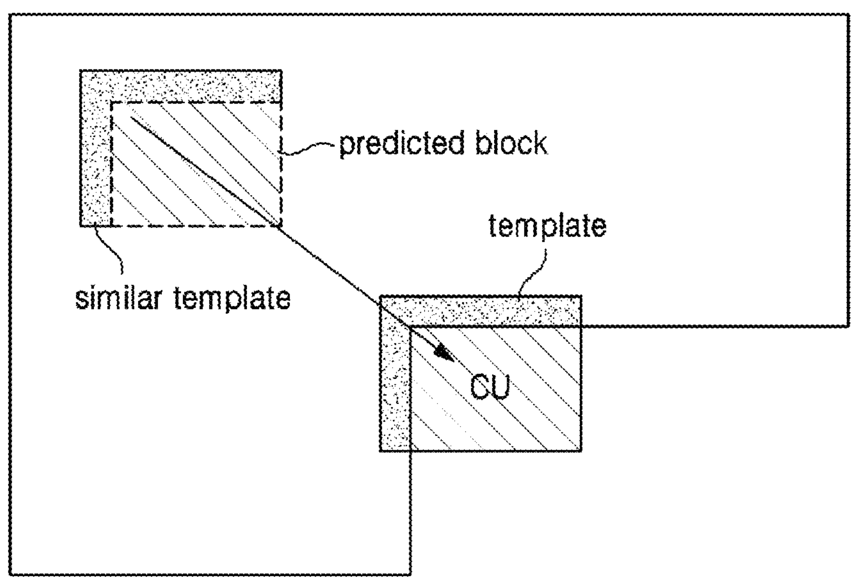
FIG. 6 is a block diagram of intra prediction base on template matching.

As another example, the video encoding device may set the secondary_mpm_flag to 0 when the gradient magnitude is equal to or smaller than the threshold, and perform template matching as illustrated in FIG. 6. The method of performing template matching may be preset based on an arrangement between the video encoding device and the video decoding device.

The video encoding device may then generate, as a prediction block of the current block, a corresponding block to the similar template according to the template matching, and may subtract the prediction block from the current block to generate a residual block. The video encoding device may encode the MPM_flag, the secondary_mpm_flag, and the residual block.

Figure 9:
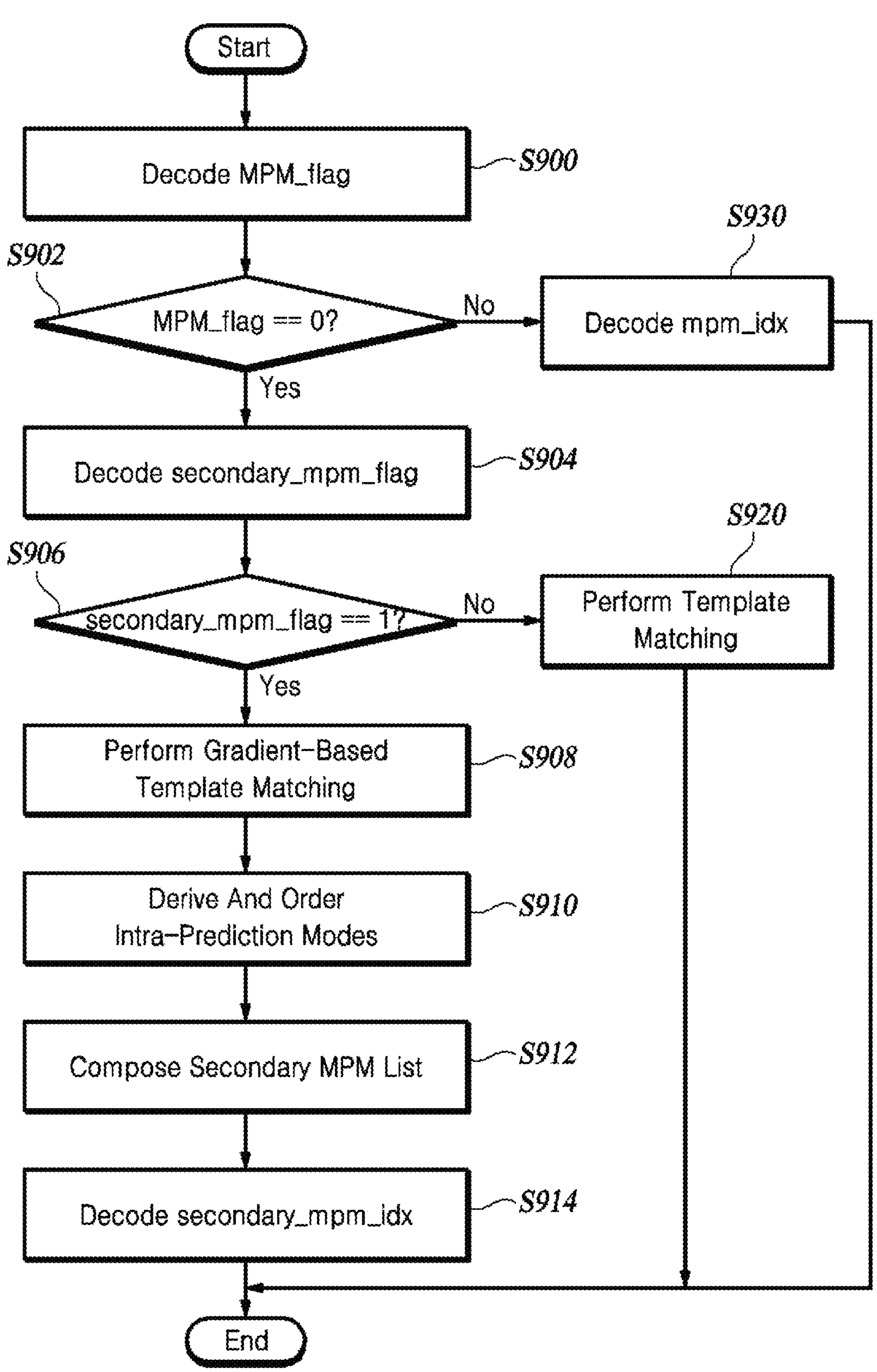
FIG. 9 is a flowchart of a method for a video decoding device to generate a secondary MPM list, according to another embodiment of the present disclosure.

FIG. 9 is a flowchart of a method for the video decoding device to generate a secondary MPM list, according to another embodiment of the present disclosure.

The case where secondary_mpm_flag is false is only be described since the other steps are the same as the flowchart illustrated in FIG. 8. If secondary_mpm_flag is false, the video decoding device performs template matching (S920).

The video decoding device may then generate, as a prediction block of the current block, a corresponding block to the similar template according to the template matching, and may add the prediction block and the residual block to reconstruct the current block.

In yet another embodiment, the video encoding device may not generate the secondary_mpm_flag, and whether the secondary MPM list is to be used may be determined based on the gradient magnitude value.

Figure 10:
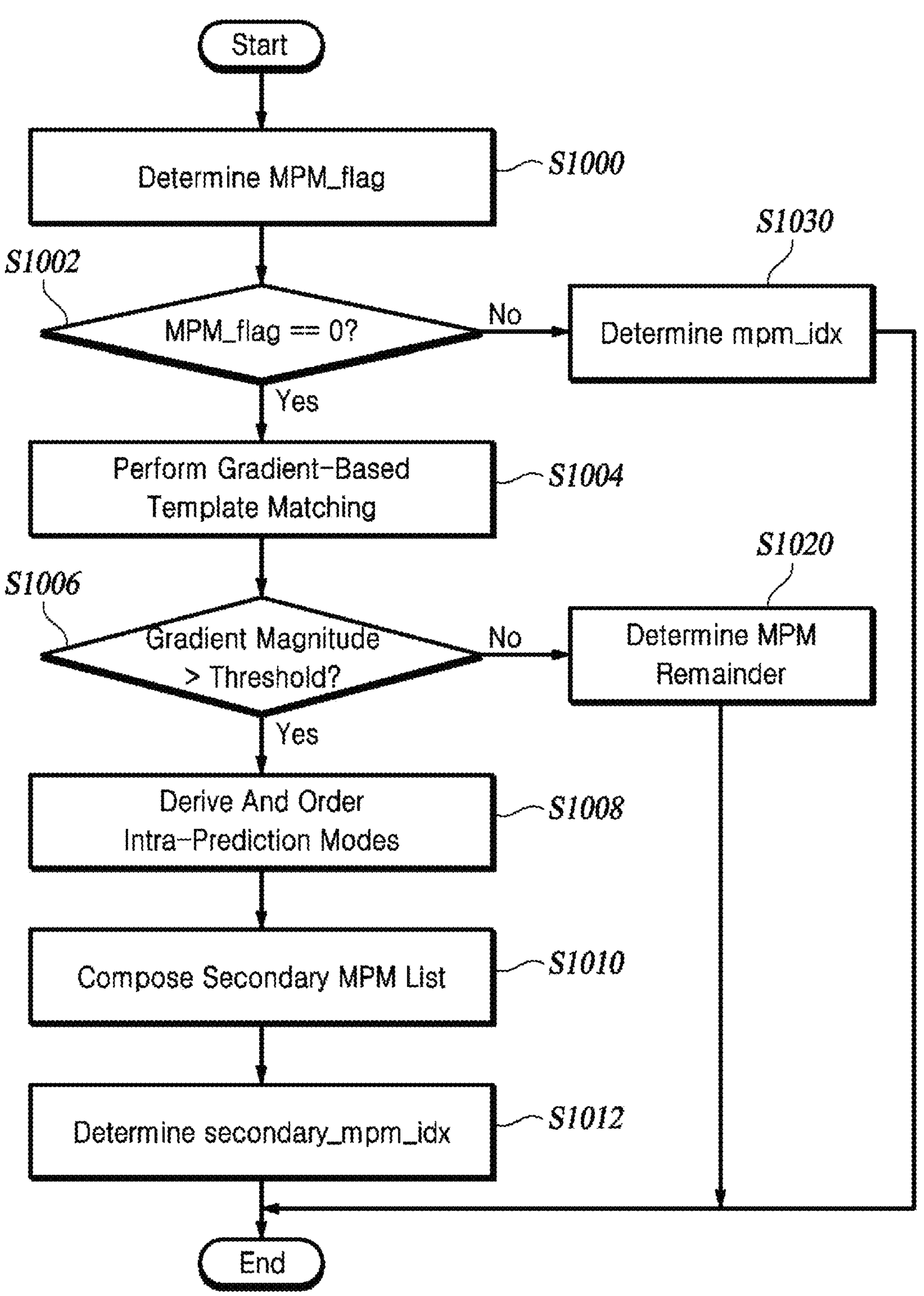
FIG. 10 is a flowchart of a method for a video encoding device to generate an MPM list, according to yet another embodiment of the present disclosure.

FIG. 10 is a flowchart of a method for the video encoding device to generate a secondary MPM list, according to yet another embodiment of the present disclosure.

The relevant description to deleting the secondary_mpm_flag is only be provided as the other steps are the same as the flowchart illustrated in FIG. 7.

If the gradient magnitude of the template is greater than a threshold, the video encoding device performs the following steps (S1008 to S1012).

As described above, if the gradient magnitude is larger than the threshold, the video encoding device may perform, before Step S1008, calculating the gradient magnitude of the predefined search region in the current block, and searching for a similar template by performing a gradient-based template matching by using the gradient magnitude of the template and the gradient magnitude of the search region.

The video encoding device uses a corresponding block to the similar template for deriving and ordering intra-prediction modes (S1008).

The video encoding device composes a secondary MPM list by using the ordered intra-prediction modes (S1010).

The video encoding device determines a secondary_mpm_idx (S1012). Here, the secondary MPM index of secondary_mpm_idx indicates one of the intra-prediction modes stored in the secondary MPM list.

The video encoding device may then use the secondary_mpm_idx to derive the intra-prediction mode of the current block from the secondary MPM list. After generating a prediction block by using the intra-prediction mode, the video encoding device may subtract the prediction block from the current block to generate a residual block. The video encoding device may encode the MPM_flag, the secondary_mpm_idx, and the residual block.

If the gradient magnitude of the template is equal to or smaller than the threshold, the video encoding device determines an MPM remainder (S1020).

Thereafter, the video encoding device may derive an intra-prediction mode of the current block based on the MPM remainder. The video encoding device may generate a prediction block by using the intra-prediction mode, and then subtract the prediction block from the current block to generate a residual block. The video encoding device may encode the MPM_flag, the MPM remainder, and the residual block.

Figure 11:
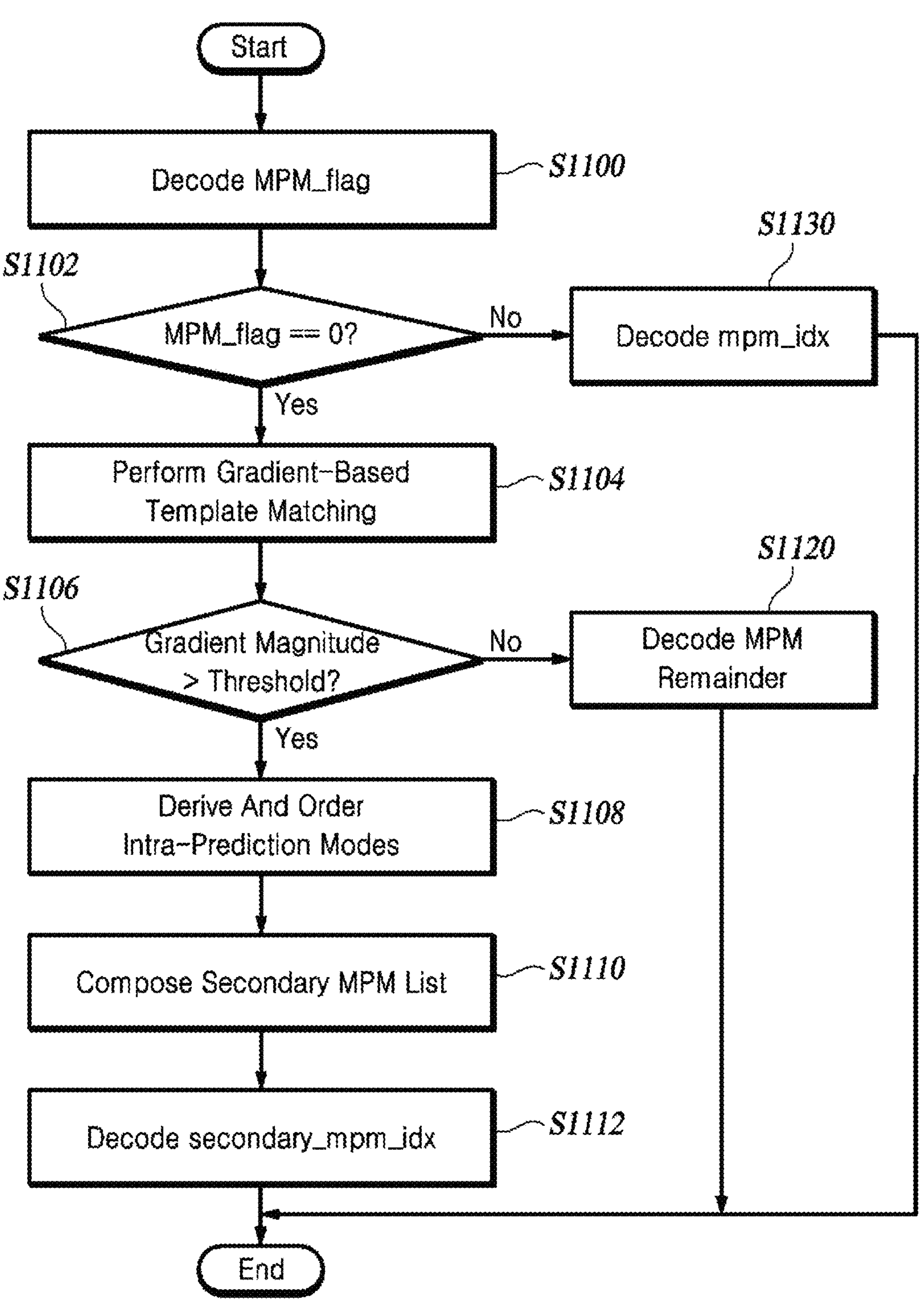
FIG. 11 is a flowchart of a method for a video decoding device to generate an MPM list, according to yet another embodiment of the present disclosure.

FIG. 11 is a flowchart of a method for the video decoding device to generate a secondary MPM list, according to yet another embodiment of the present disclosure.

The relevant description to deleting the secondary_mpm_flag is only be provided as the other steps are the same as the flowchart illustrated in FIG. 7.

If MPM_flag is false, the video decoding device performs the following steps.

The video decoding device performs gradient-based template matching in a predefined search region to search for the similar template (S1104).

The video decoding device compares the gradient magnitude to a threshold (S1106).

If the gradient magnitude is greater than the threshold, the video decoding device performs the following steps.

In terms of reducing computational complexity, among the sub-steps of performing template matching in Step S1104, the video decoding device may perform just setting the template of the current block and calculating the gradient magnitude of the template by applying a differential filter to the template. Therefore, upon checking whether, and determining that, the gradient magnitude is larger than the threshold, the video decoding device may perform, before Step S1108, calculating the gradient magnitude of the predefined search region of the current block, and searching for a similar template by performing gradient-based template matching by using the gradient magnitude of the template and the gradient magnitude of the search region.

The video decoding device uses the corresponding block to the similar template for deriving and ordering the intra-prediction modes (S1108).

The video decoding device composes a secondary MPM list by using the ordered intra-prediction modes (S1110).

The video decoding device decodes the secondary_mpm_idx from the bitstream (S1112). Here, the secondary MPM index of secondary_mpm_idx indicates one of the intra-prediction modes stored in the secondary MPM list.

The video decoding device may then use the secondary_mpm_idx to derive the intra-prediction mode of the current block from the secondary MPM list. The video decoding device may generate a prediction block by using the intra-prediction mode, and then add the prediction block and the residual block to reconstruct the current block.

If the gradient magnitude is equal to or smaller than the threshold, the video decoding device decodes the MPM remainder from the bitstream (S1120).

The video decoding device may then derive an intra-prediction mode of the current block based on the MPM remainder. The video decoding device may generate a prediction block by using the intra-prediction mode, and then add the prediction block and the residual block to reconstruct the current block.

On the other hand, the method of calculating the gradient magnitude may be set to be the same according to an arrangement between the video encoding device and the video decoding device. Additionally, the threshold value that is compared to the gradient magnitude may have a preset value set according to an arrangement between the video encoding device and the video decoding device.

The following describes the steps of gradient-based template matching, deriving and ordering intra-prediction modes, and composing the secondary MPM list, primarily in the video encoding device. The steps described below may be equally applicable to the video decoding device. First, the step of gradient-based template matching is described.

The video encoding device calculates the gradient magnitude of the reconstructed region and the gradient magnitude of the template. Based on the calculated values of the gradient magnitudes, the video encoding device searches for a similar template in the reconstructed region, thereby performing the gradient-based template matching.

Figure 12:
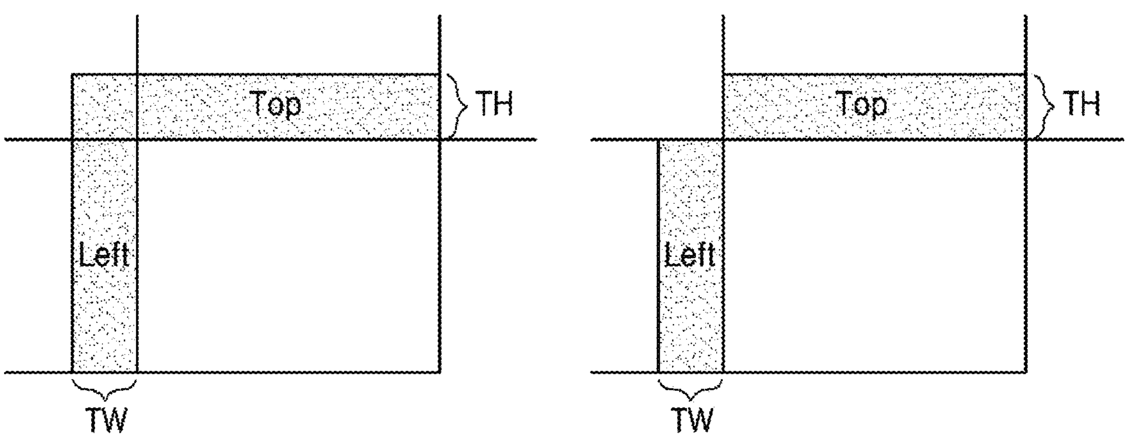
FIG. 12 is a diagram illustrating forms of templates, according to at least one embodiment of the present disclosure.

The template may be composed of neighboring regions of the current block and may be in the form illustrated in FIG. 12. In the examples of FIG. 12, TW and TH represent a horizontal length and a vertical length of the template, respectively, and may be preset based on an arrangement between the video encoding device and the video decoding device. The shape of the template may be preset based on an arrangement between the video encoding device and the video decoding device. Alternatively, the video encoding device may encode an index indicative of one of the preset forms of the template and signal the index to the video decoding device.

Figure 13:
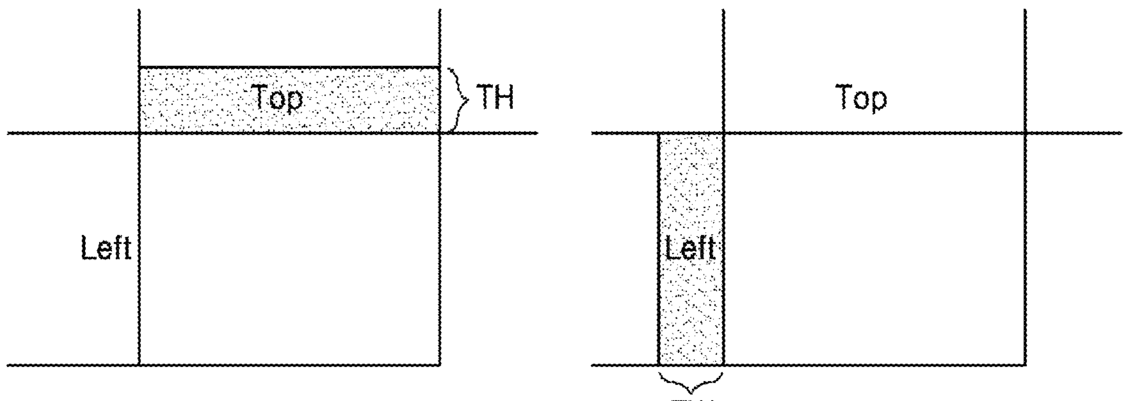
FIG. 13 is a diagram illustrating forms of templates based on prediction modes of reconstructed regions, according to at least one embodiment of the present disclosure.

The shape of the template may vary depending on the prediction mode of the reconstructed region. As shown in the example of FIG. 13, if the top block is predicted in a vertical directional mode and the left block is predicted in a non-directional mode, only the template corresponding to the top block may be used. Alternatively, if the top block is predicted in non-directional mode and the left block is predicted in horizontal directional mode, only the template corresponding to the left block may be used.

Figure 14:
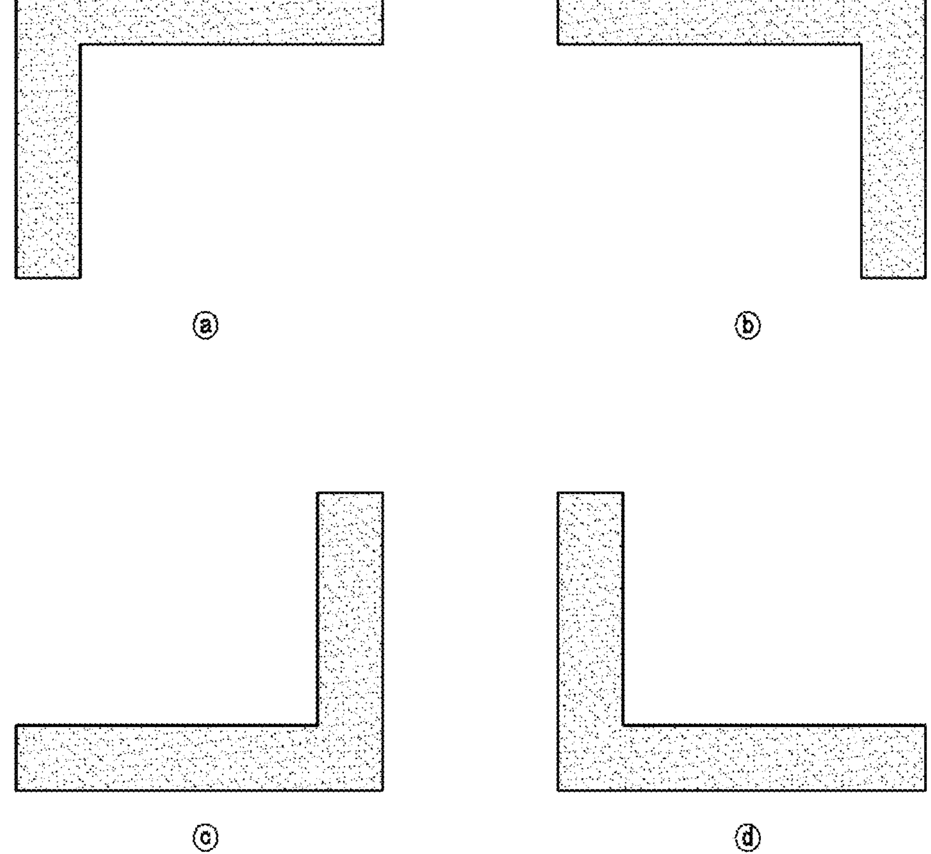
FIG. 14 is a diagram illustrating a rotation of a template, according to at least one embodiment of the present disclosure.

As another example, after rotating the template, the video encoding device may look for a similar template in the search region. As illustrated in FIG. 14, a default template (ⓐ), a template rotated 90 degrees Clockwise (ⓑ), a template rotated 180 degrees (ⓒ), and a template rotated 270 degrees (ⓓ) may be used.

A gradient value of the template may be calculated by applying a differential filter to the template. A Prewitt filter, Roberts filter, Sobel filter, or the like may be used as the differential filter in the horizontal and vertical directions. Using the dx and dy values, which are the gradient values calculated by using the differential filter, the gradient magnitude may be calculated for each pixel in the template as shown in Equation 1 or Equation 2. The calculated gradient magnitude of the template may be stored and managed for future use.

$$|G| = |dx| + |dy| \quad \text{[Equation 1]}$$

$$|G| = \sqrt{dx^2 + dy^2} \quad \text{[Equation 2]}$$

As described above, if the sum of the gradient magnitudes of the pixels in the template is less than or equal to a preset threshold, the secondary MPM list is not composed. In this case, the secondary_mpm_flag is set to 0 and an MPM remainder is signaled.

Figure 15:
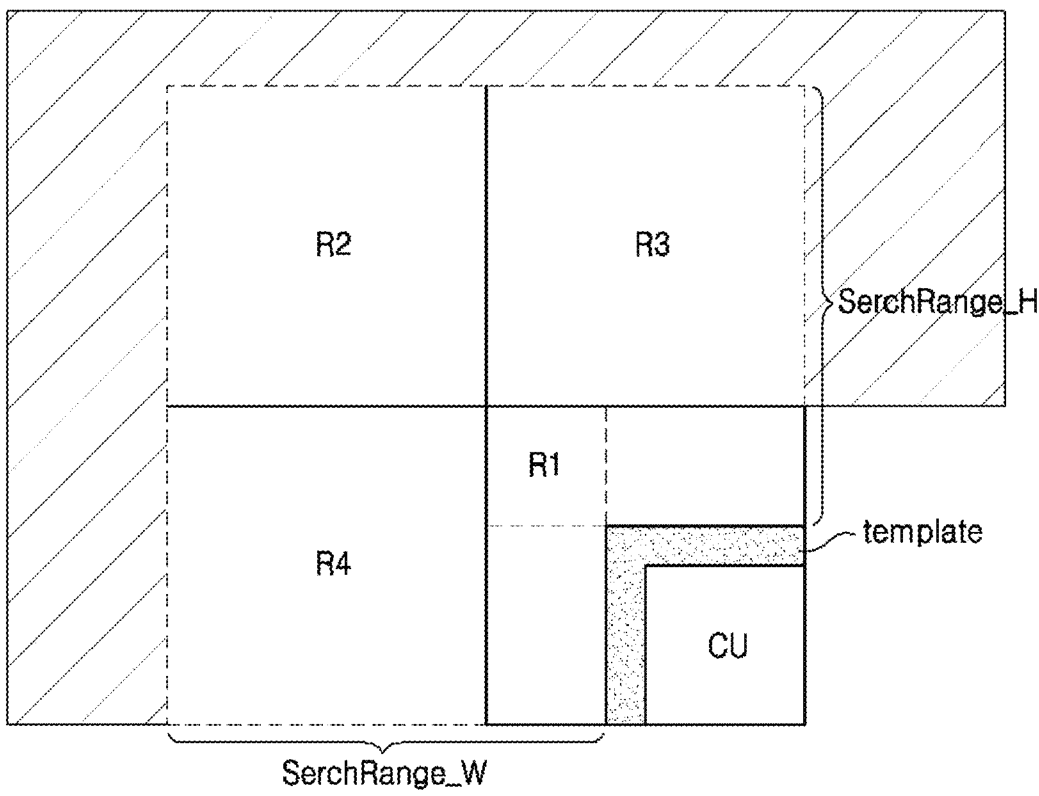
FIG. 15 is a diagram illustrating search regions for template matching, according to at least one embodiment of the present disclosure.

FIG. 15 is a diagram illustrating search regions for template matching, according to at least one embodiment of the present disclosure.

In the example of FIG. 15, regions R1, R2, R3, and R4 within the reconstruction region may be a block within the current CTU, a block at the top-left of the current CTU, a block at the top of the current CTU, and a block at the left of the current CTU, respectively. These search regions may be preset based on an arrangement between the video encoding device and the video decoding device. Further, in the example of FIG. 15, SearchRange_W and SearchRange_H may be preset based on an arrangement between the video encoding device and the video decoding device.

For the search regions illustrated in FIG. 15, by applying a differential filter as described above, a gradient value may be calculated. Using the dx and dy values, which are the gradient values calculated by using the differential filter, a gradient magnitude may be calculated for each pixel within the search regions, as shown in Equation 1 or Equation 2. The calculated gradient magnitudes may be stored and managed for future use.

The type of differential filter, and the method of calculating the gradient magnitude, may be preset based on an arrangement between the video encoding device and the video decoding device. Further, the type of the differential filter and the method of calculating the gradient magnitude are the same between the template and the search region.

Figure 16:
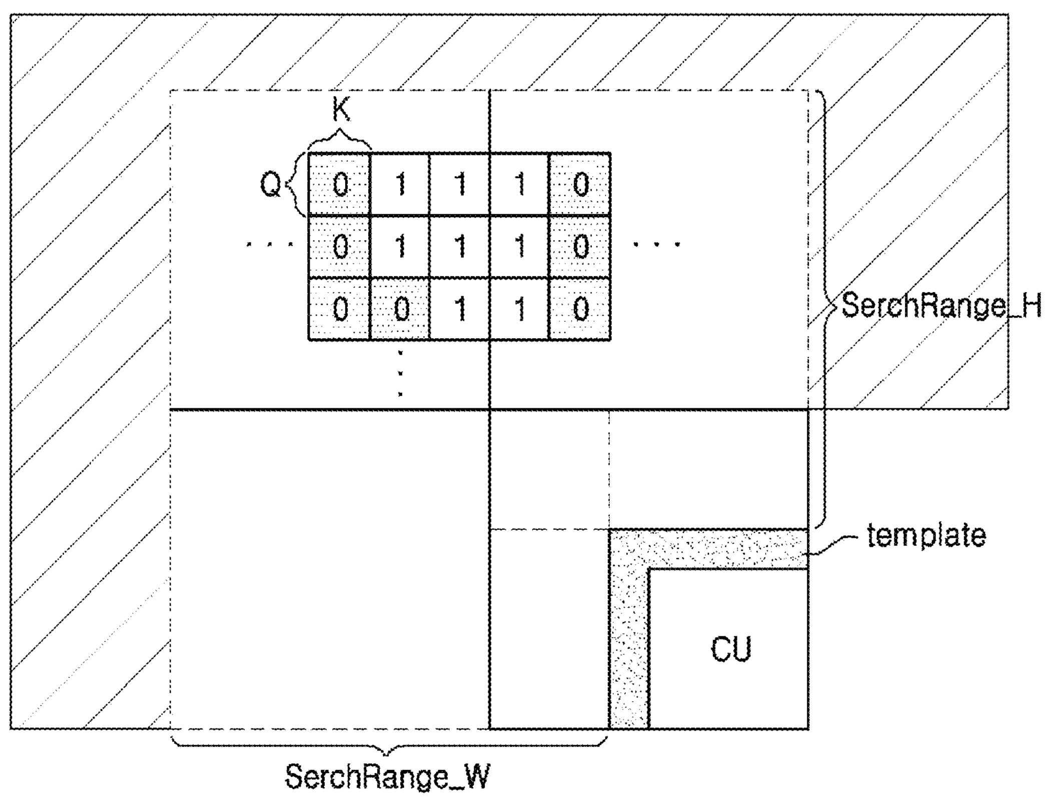
FIG. 16 is a diagram illustrating the calculation of a gradient magnitude in a search region, according to at least one embodiment of the present disclosure.

FIG. 16 is a diagram illustrating the calculation of a gradient magnitude in a search region, according to at least one embodiment of the present disclosure.

The video encoding device proceeds through the encoding sequence, calculates and stores a gradient magnitude for each K×Q block. Here, the size of a K×Q block may be CTU, CU, Prediction Unit (PU), or Transform Unit (TU) size. If a K×Q block for the current block is not included in the search region bounded by SearchRange_W and SearchRange_H, the video encoding device may discard the pre-stored gradient magnitude of that block. The video encoding device may compare, with the threshold, the gradient magnitude in the K×Q block unit stored within the search regions according to SearchRange_W and SearchRange_H and perform template matching only for blocks having a gradient magnitude greater than the threshold. By not searching for regions having a gradient magnitude that is equal to or smaller than the threshold, the complexity of performing template matching can be reduced. Here, the gradient magnitude by the K×Q block unit represents the sum of the gradient magnitudes of the pixels in the K×Q block.

In the example of FIG. 16, K and Q are integers greater than or equal to 1. Additionally, as described above, between the template and search regions, the type of the differential filter and the method of calculating the gradient magnitude are the same.

The video encoding device, after calculating the gradient magnitude of the template, performs gradient-based template matching by using the gradient magnitude in the K×Q block unit pre-stored in SearchRange_W and SearchRange_H. As a cost function for template matching, SAD (Sum of Absolute Difference), SSD (Sum of Squared Difference), and the like may be used. The cost function may be set in advance according to an arrangement between the video encoding device and the video decoding device.

The method of calculating the gradient magnitude for each K×Q block, as illustrated in FIG. 16, may be equally applied to the video decoding device.

The steps of deriving and ordering the intra-prediction modes are described below.

Figure 17:
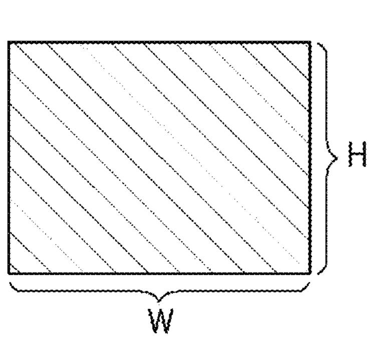
FIG. 17 is a diagram illustrating a region over which a histogram of oriented gradient (HoG) is calculated, according to at least one embodiment of the present disclosure.
Figure 17:
Figure 17:
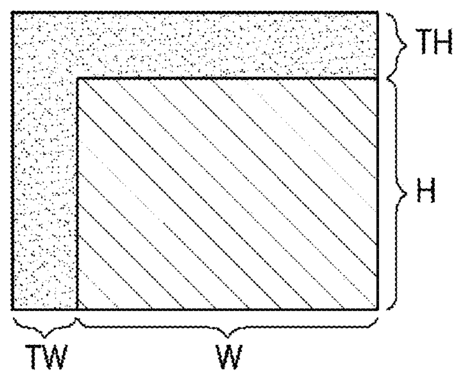

The video encoding device may utilize a histogram of oriented gradients (HoG) to derive intra-prediction modes from a similar template found in the gradient-based template matching step, and the corresponding block adjacent to the similar template. HoG may be applied to the corresponding block of size W×H, or a block of size (W+TW)×(H+TH) containing the similar template and corresponding block, as illustrated in FIG. 17. Hereinafter, for convenience, a W×H block or a (W+TW)×(H+TH) block is collectively referred to as a corresponding block.

With the HoG applied to the corresponding block, the directionality of the gradient and the magnitude of the gradient may be calculated to compose a histogram. A differential filter, such as a Sobel filter, may be applied to calculate the orientation of the gradient and the magnitude of the gradient for each pixel of the corresponding block.

Further, the histogram may be calculated as follows. The video encoding device calculates the gradient values dx and dy for each pixel of the corresponding block by using the Sobel filter in the vertical and horizontal directions. For each pixel, the gradient magnitude may be calculated according to Equation 1 or 2 by using dx and dy. Additionally, for each pixel, the angle_value indicating the directionality may be calculated by applying a shift operation after calculating the gradient (dy/dx) by using dx and dy according to Equation 3.

$$\text{angle\_value} = \frac{dy}{dx} << \text{shift} \qquad \text{[Equation 3]}$$

A directionality table of angleTable may be defined in advance to generate an intra-prediction mode, i.e., an index intra_mode_index of the intra-prediction mode. In this case, an index i of the directionality table may represent the index of the intra-prediction mode. As shown in Equation 4, the intra-prediction mode index of each pixel may be calculated such that the SAD value between angleTable[i] and angle_value is the smallest.

$$\text{intra\_mode\_index} = \text{argmin}_i |\text{angleTable}[i] - \text{angle\_value}[x][y]| \qquad \text{[Equation 4]}$$

In one example, after generating the histogram of the gradient magnitudes according to the intra-prediction mode indices of the respective pixels, the prediction modes' indices (i.e., the intra-prediction modes) may be ordered in descending order according to the cumulative gradient magnitude.

As another example, after generating the histogram of the frequency of occurrence of the intra-prediction modes, the prediction modes' indices (i.e., the intra-prediction modes) may be ordered in descending order by the frequency of occurrence.

The aforementioned method of generating the HoG may be preset under an arrangement between the video encoding device and the video decoding device.

Figure 18:
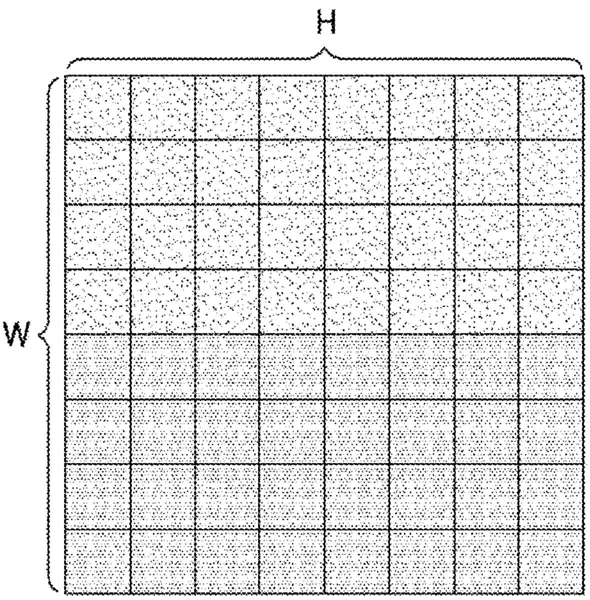
FIG. 18 is a diagram illustrating current blocks each partitioned into subblocks.
Figure 18:
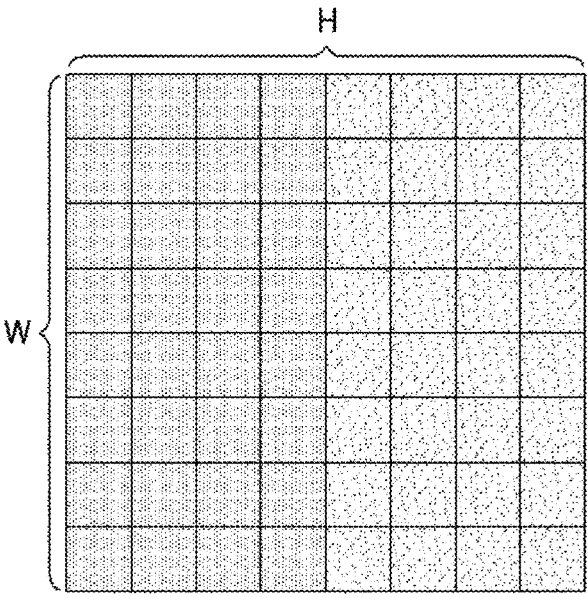

FIG. 18 is a diagram illustrating current blocks each partitioned into subblocks.

When the Intra Sub-Partitions (ISP) technique is used, the current block may be partitioned in either a vertical or horizontal direction depending on the current block size, as illustrated in FIG. 18. The video encoding device may generate HoGs for the prediction blocks in the subblock unit and order the prediction modes in descending order, for example, according to the cumulative gradient magnitude.

The following describes the step of composing a secondary MPM list.

Figure 19:
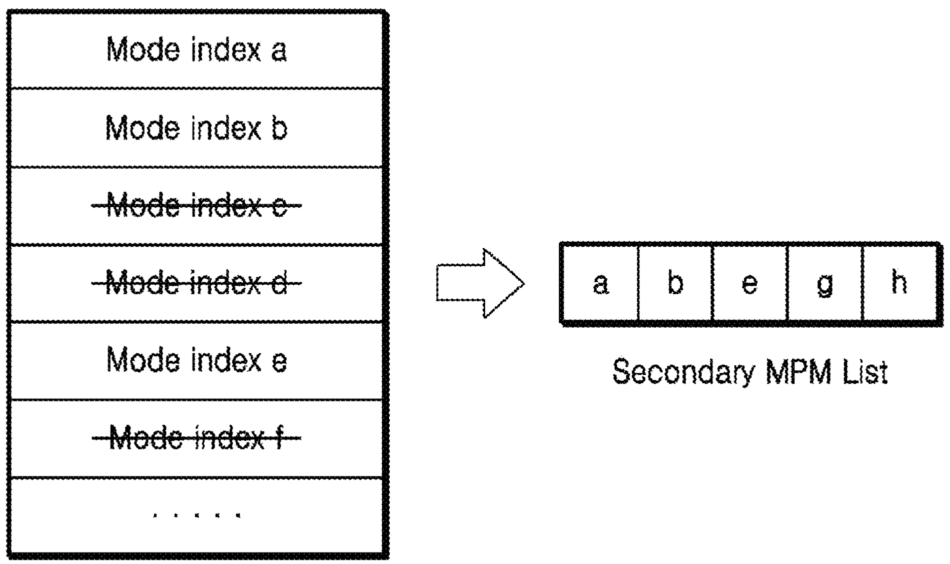
FIG. 19 is a diagram illustrating the composing of a secondary MPM list, according to at least one embodiment of the present disclosure.

The video encoding device may compose the secondary MPM list with the prediction modes' indices ordered in descending order. Since the secondary MPM list is composed when the MPM flag is 0, the secondary MPM list may be composed with the prediction modes included in the primary MPM list removed to avoid duplication. In the example of FIG. 19, intra-prediction mode indices a, b, c, d, e, . . . are intra-prediction modes' indices ordered in descending order and may be candidates for the secondary MPM list. If intra-prediction mode indices c and f are prediction modes included in the primary MPM list, they may be removed from the candidates, as in the illustration of FIG. 19.

The secondary MPM list has a predefined size. The size of the secondary MPM list may be preset based on an arrangement between the video encoding device and the video decoding device.

For a secondary MPM list of predefined size, the candidates in the MPM list may not be fulfilled with only the prediction modes ordered in descending order. In such cases, the unfilled index positions in the secondary MPM list may be filled with the neighboring indices of the candidates stored in the secondary MPM list. For example, it is assumed that the size of the secondary MPM list is 5 and the prediction modes a, b, and e are stored as candidates in the secondary MPM list. The unfilled candidate positions in the secondary MPM list may be filled with the neighboring indices a−γ, a+Γ, b−γ, b+γ, e−γ, e+γ, and the like of the stored indices. In this case, the method may prioritize the corresponding neighboring indices of the higher-order intra-prediction modes in descending order. Here, y is an integer greater than or equal to 1.

In one example, the secondary MPM list of a predefined size may not be utilized if the candidates in the MPM list cannot be populated with only the prediction modes ordered in descending order. If the secondary MPM list is not utilized, the video encoding device is configured to set the secondary_mpm_flag to 0 and determine the MPM remainder. The video encoding device then signals the secondary_mpm_flag and the MPM remainder to the video decoding device. The video decoding device may first decode the secondary_mpm_flag and the MPM remainder, confirming the secondary_mpm_flag is false, and derive an intra-prediction mode based on the MPM remainder.

Figure 20:
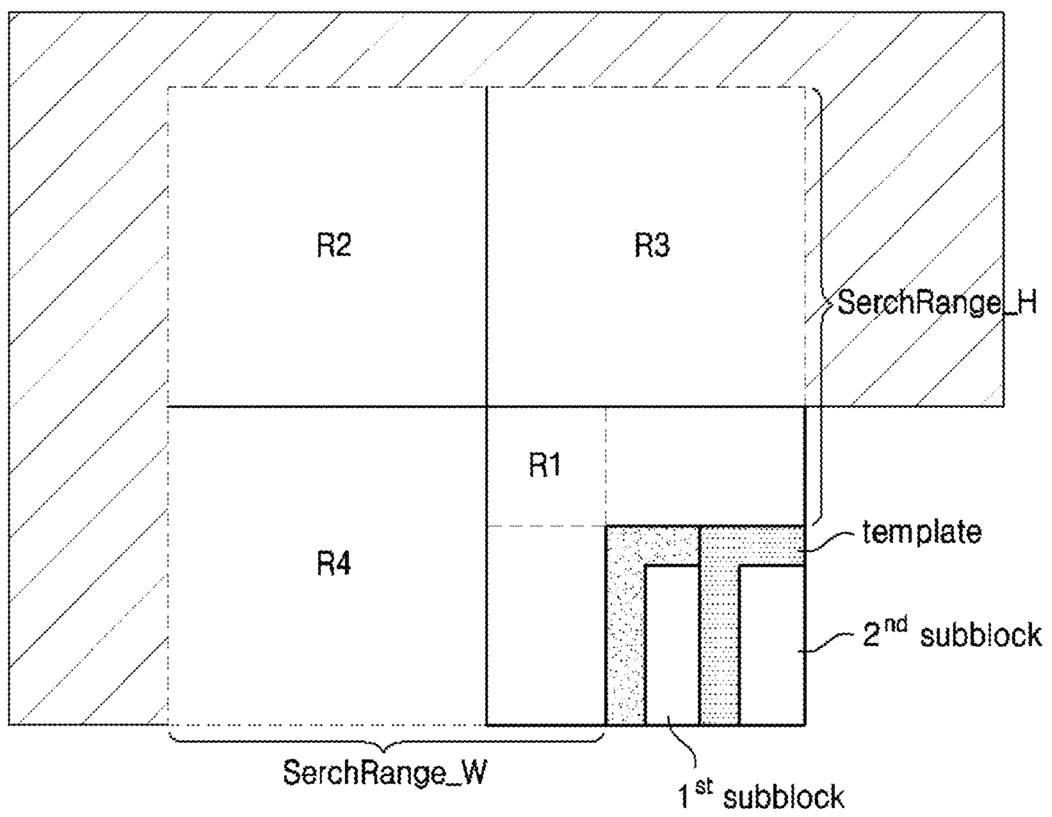
FIG. 20 is a diagram illustrating template matching per a subblock basis, according to at least one embodiment of the present disclosure.

FIG. 20 is a diagram illustrating template matching per a subblock basis, according to at least one embodiment of the present disclosure.

When the current block is divided into subblocks as described above, the video encoding device may perform template matching per a subblock basis. As illustrated in FIG. 20, a template may be defined for each subblock.

The video encoding device may take the steps of performing the gradient-based template matching, deriving and ordering the intra-prediction modes, and composing the secondary MPM list in subblock units. Performed on the first subblock are the steps of performing the gradient-based template matching, deriving and ordering the intra-prediction modes, and composing the secondary MPM list. Then, the first subblock may be reconstructed by prediction, transform, quantization, inverse quantization, and inverse transform. A portion of the reconstructed first subblock may constitute a new template for the second subblock. Then, the second subblock may undergo the steps of performing the gradient-based template matching, deriving and ordering the intra-prediction modes, and composing the secondary MPM list.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

What is claimed is:

1. A method of decoding a current block, performed by a video decoding device, the method comprising:

setting a template of the current block;

determining a corresponding block in a reconstructed region of a current picture based on a matching cost between a template of the corresponding block and the template of the current block;

calculating gradient magnitudes and gradient directions for pixels of the corresponding block;

generating a HoG (Histogram of Gradients) based on the gradient magnitudes and the gradient directions;

deriving intra-prediction modes of the current block based on the HoG; and generating a prediction block of the current block based on the intra-prediction modes of the current block.

2. The method of claim 1, wherein determining the corresponding block includes:

calculating a gradient magnitude of the template of the current block by applying a differential filter to the template;

calculating a gradient magnitude in K×Q blocks for a predefined search region, K and Q being integers greater than or equal to 1; and determining the corresponding block by calculating the matching cost based on the gradient magnitude of the template of the current block and the gradient magnitude in K×Q blocks.

3. The method of claim 2, wherein the matching cost is calculated when the gradient magnitude in K×Q blocks is equal to or greater than a preset threshold.

4. The method of claim 1, wherein deriving the intra-prediction modes of the current block includes:

accumulating the gradient magnitudes into intra-prediction mode indices according to the gradient directions; and ordering the intra-prediction mode indices in descending order according to a cumulative gradient magnitude for each intra-prediction mode index.

5. The method of claim 4, wherein accumulating the gradient magnitudes includes:

calculating a gradient magnitude value for each of the pixels of the corresponding block, calculating a directionality by using the gradient magnitude value, and then calculating the intra-prediction mode index by using the directionality and a predefined directionality table.

6. A method of encoding a current block, performed by a video encoding device, the method comprising:

setting a template of the current block;

determining a corresponding block in a reconstructed region of a current based on a matching cost between a template of the corresponding block and the template of the current block;

calculating gradient magnitudes and gradient directions for pixels of the corresponding block;

generating a HoG (Histogram of Gradients) based on the gradient magnitudes and the gradient directions;

deriving intra-prediction modes of the current block based on the HoG; and generating a prediction block of the current block based on the intra-prediction modes of the current block.

7. A non-transitory computer-readable recording medium storing a bitstream generated by a video encoding method, the video encoding method comprising:

setting a template of the current block;

determining a corresponding block in a reconstructed region of a current picture based on a matching cost between a template of the corresponding block and the template of the current block;

calculating gradient magnitudes and gradient directions for pixels of the corresponding block;

generating a HoG (Histogram of Gradients) based on the gradient magnitudes and the gradient directions;

deriving intra-prediction modes of the current block based on the HoG; and generating a prediction block of the current block based on the intra-prediction modes of the current block.

8. The method of claim 1, wherein the matching cost includes at least one of Sum of Absolute Difference (SAD) or Sum of Squared Difference (SSD).

9. The method of claim 6, wherein the matching cost includes at least one of Sum of Absolute Difference (SAD) or Sum of Squared Difference (SSD).

10. The non-transitory computer-readable recording medium of claim 7, wherein the matching cost includes at least one of Sum of Absolute Difference (SAD) or Sum of Squared Difference (SSD).

* * * * *